United States Patent [19]
Augsburger

[11] 3,846,612
[45] Nov. 5, 1974

[54] PROCESS FOR SECURING A HOROLOGICAL BALANCE SPRING OR HAIR SPRING AND A COLLET TOGETHER BY WELDING

[75] Inventor: Jean-Jacques Augsburger, Lausanne, Switzerland

[73] Assignee: Erfinor A.G., Canton of Berne, Switzerland

[22] Filed: Nov. 15, 1973

[21] Appl. No.: 416,265

[30] Foreign Application Priority Data
Dec. 15, 1972  Switzerland...................... 18276/72

[52] U.S. Cl............................. 219/121 LM, 58/115
[51] Int. Cl........................................... B23k 27/00
[58] Field of Search..... 219/121 L, 121 LM; 58/115

[56] References Cited
UNITED STATES PATENTS
3,016,688  1/1962  Rueger................... 58/115
3,071,365  1/1963  Henchoz............. 58/115 X
3,429,120  2/1969  Charpilloz.................. 58/115
3,673,376  6/1972  Kullmann................. 219/121 LM

*Primary Examiner*—J. V. Truhe
*Assistant Examiner*—Clifford C. Shaw
*Attorney, Agent, or Firm*—Imirie and Smiley

[57] ABSTRACT

When a watch spring is to be welded to a collet, difficulties arise from the small size and weight of the parts concerned. There are overcome by locating the spring on a rotatable plate, placing the collet on an arbour concentric with the spring, connecting an electric potential between the collet and spring, rotating the spring till its inner end touches a nose on the collet, producing a slight locating weld by a spark passing between the parts, and then applying a welding laser beam to the joint.

4 Claims, 4 Drawing Figures

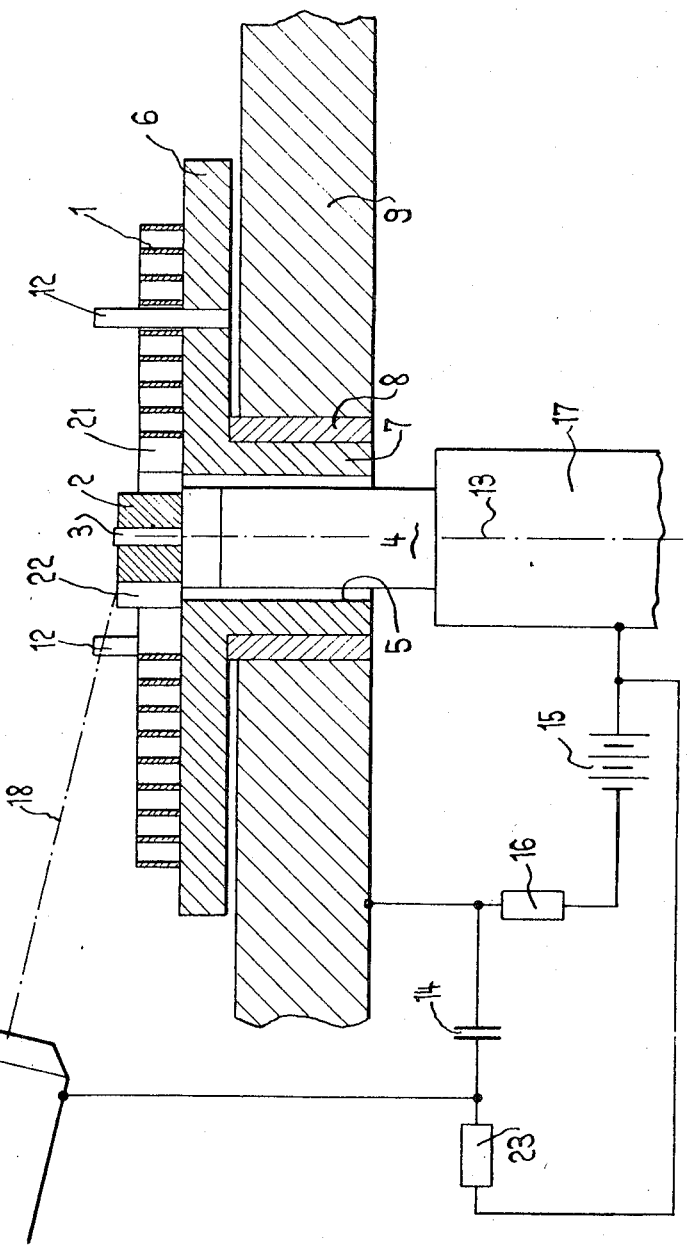

PROCESS FOR SECURING A HOROLOGICAL BALANCE SPRING OR HAIR SPRING AND A COLLET TOGETHER BY WELDING

The present invention is concerned with a process for securing a horological balance spring or hair spring and a collet together by welding.

When accurate relative positioning of the members is of major importance, and their dimensions do not permit them to be pre-fixed or held in their welding positions by machanical means, it is difficult to guarantee maintenance of these positions during welding, mainly because of the relatively large amount of energy applied in the course of the welding operation, which can produce displacement of the parts with respect to one another.

The object of the present invention is to provide a welding process, which avoids the difficulty mentioned above and which can be put into practice in a simple manner.

According to the present invention there is, therefore, a process provided for fixing the inner end of a horological balance spring on a collet and then welding the two parts together, including the steps of preliminarily positioning said balance spring on a conducting rotatable support, locating said collet on an arbour insulated from said support, applying an electric potential between said arbour, and said rotating support and spring, bringing the inner end of said spring into contact with said collet so that an electric spark pre-fixes said spring and collet together in the required position, and then applying a laser to weld said spring and collet together.

Reference is now made to the accompanying drawings, in which:

FIG. 2 is a partial sectional elevation along the line II—II of FIG. 1;

Figure 1:
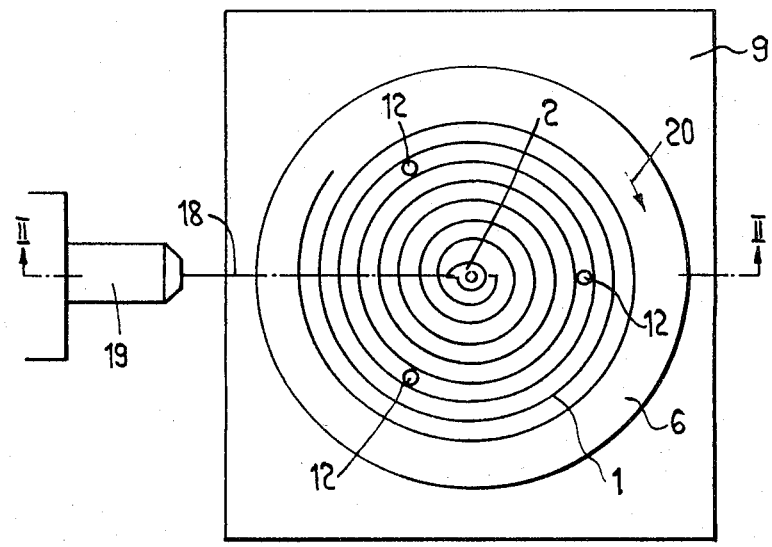
FIG. 1 is a plan view of a soldering device.

The process, the subject of the invention, will now be described with reference to FIGS. 1 and 2. These figures show a horological balance spring 1 and a collet 2 placed on a stud 3 of an arbour 4, which traverses a central opening 5 machined in a rotatable support or plate 6.

The plate 6 has a neck 7 freely turning in a journal 8 fixed in a table 9. On the plate 6 there are pins 12, which position the balance spring 1 in such a manner that its center coincides with the axle 13.

The plate 6, carrying the balance spring 1, is insulated from the remainder of the apparatus by the central opening 5; it is connected to one terminal of a circuit including a capacitor 14, a source of voltage 15, a charging resistor 16 and a discharge resistor 23. The other terminal of the circuit is connected via a support 17 to the collet.

Figure 3:
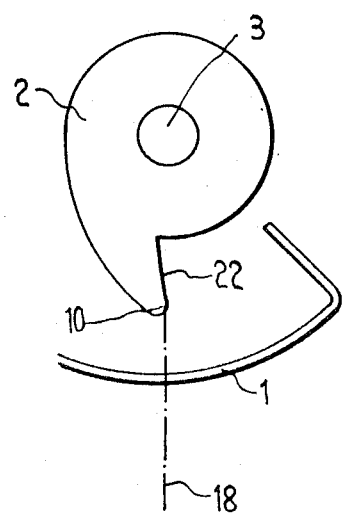
FIG. 3 is an enlarged plan of a balance spring and collet before soldering.

The operation of the apparatus is as follows:

After having placed the collet 2 on the peg 3 so positioned that edge 10 of its nose (FIG. 3) substantially coincides with the optical axis 18 of a laser 19, the balance spring 1 is placed on the rotatable table 6, located by the positioning pins as shown in FIG. 1, whereafter the plate 6 is turned in the direction of the arrow 20 so as to bring the inner end 21 of the balance spring 1 against the surface 22 adjacent to the edge 10.

Figure 4:
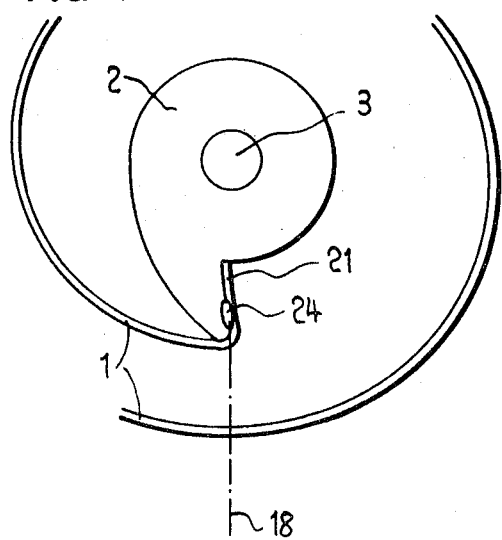
FIG. 4 is a view of FIG. 3 after soldering.

At this moment the capacitor 14 is discharged, producing a minute spark weld between the balance spring 1 and the collet 2, thereby pre-fixing said spring on said collet. Now the voltage change across resistor 23 causes through a suitable control circuit, not shown in the drawing, emission of a light flash from a laser 19 (FIG. 4), which firmly welds the end 21 of the balancing spring 1 on the collet 2 at the point 24.

The pre-fixing of the balance spring 1 on the collet 2 by sparking ensures accurate location of the two members (collet 2 and balance spring 1) and prevents displacement of the balance spring during the action of the laser.

We claim:

1. A process for fixing the inner end of a horological balance spring on a collet and then welding the two parts together including the steps of preliminarily positioning said balance spring on a conducting rotatable support, locating said collet on an arbour insulated from said support, applying an electric potential between said arbour and said rotating support and spring, bringing the inner end of said spring into contact with said collet so that an electric spark preliminarily bonds said spring and collet together in the required position, and then applying a laser beam to weld said spring and collet together.

2. A process in accordance with claim 1 wherein said spark produces a signal, which initiates application of said laser beam.

3. A process in accordance with claim 1 including the steps of initially bending said inner end of said balance spring radially inward and providing a nose on said collet with which said bent end is brought into contact.

4. A process in accordance with claim 1, including the steps of connecting said balance spring to one terminal of a discharge circuit including a capacitor and a resistor and connecting said collet to another terminal of said discharge circuit.

* * * * *